United States Patent [19]

Forsyth

[11] 3,879,318

[45] Apr. 22, 1975

[54] ORGANIC AMIDE CONTAINING COMPOSITIONS AND PROCESS FOR THICKENING CONTROL OF POLYESTERS

[75] Inventor: George E. Forsyth, Trevose, Pa.

[73] Assignee: Rohm and Haas Company, Philadelphia, Pa.

[22] Filed: June 2, 1972

[21] Appl. No.: 259,055

[52] U.S. Cl............... 260/16; 252/1; 260/33.6 UA; 260/40; 260/862; 260/864
[51] Int. Cl........................................... C08g 39/10
[58] Field of Search ............ 260/16, 862, 864, 861, 260/865

[56] References Cited
UNITED STATES PATENTS

| | | | |
|---|---|---|---|
| 3,484,401 | 12/1969 | Rudolph et al. | 260/864 |
| 3,548,029 | 12/1970 | Stahly et al. | 260/864 |
| 3,631,144 | 12/1971 | Deis et al. | 260/864 |
| 3,631,217 | 12/1971 | Rabenold | 260/864 |
| 3,632,668 | 1/1972 | Kinney et al. | 260/864 |

FOREIGN PATENTS OR APPLICATIONS

| | | | |
|---|---|---|---|
| 697,214 | 9/1971 | South Africa | 260/862 |

OTHER PUBLICATIONS

Chem. Absts., Vol. 69, 3449p "Rate-controlled Copolymerization of Polyesters with Other Monomers," Hopff et al.

Chem. Absts., Vol. 71: 4239y, "Melt-molding Oxyalkylated Polyamides," Kosuga, et al.

Chem. Abstr., Vol. 63:8570g, "Stabilized Urea"-Formaldehyde Precondensates, Vauck.

Primary Examiner—Melvin Goldstein
Assistant Examiner—Edward Woodberry
Attorney, Agent, or Firm—Michael B. Fein

[57] ABSTRACT

Methods for producing a controlled increase in viscosity of uncured polyester resin compositions and maintaining desired viscosity for extended periods comprising admixing with said uncured polyester resin an organic amide in specified proportions as thickening controller in combination with conventional alkaline earth oxide or hydroxide thickening agent. Polyester compositions containing organic amide thickening control agent; compositions comprising mixtures of organic amide thickening controller and alkaline oxide or hydroxide thickening agent; compositions comprising a mixture of thermoplastic polymer low shrink modifier and thickening controller; and sheet molding compounds of moldable viscosity are disclosed.

16 Claims, 2 Drawing Figures

ORGANIC AMIDE CONTAINING COMPOSITIONS AND PROCESS FOR THICKENING CONTROL OF POLYESTERS

This invention relates to improved uncured unsaturated polyester resin mixtures and polymerization products as well as to processes for controlling the thickening of said resins. The invention is applicable to both conventional and low shrink systems, and to both bulk molding compounds (BMC) and sheet molding compounds (SMC). The invention also relates to a polyester resin system which undergoes a rapid increase in viscosity at ambient temperature and maintains the desired viscosity for extended periods of time.

Glass fiber reinforced polyester resin compositions are well-known in the art. They comprise chopped glass fibers, woven glass fiber fabrics, and randomly oriented glass fiber mats as reinforcement for a cured thermoset mass of unsaturated polyester resin. Customarily the polyester resin is combined with the fibrous reinforcing material prior to the curing of the resin. It is, however, known and, in fact, the prevailing method to apply a liquid state unsaturated polyester resin composition to fibrous reinforcing materials and to thicken the liquid polyester resin prior to curing thereof. To effect the thickening reaction, it is known to incorporate an alkaline earth oxide or hydroxide thickening agent. However, the thickening reaction in practice is frequently quite dependent on the particular polyester compositions, temperature, moisture in system, and other variables causing undesired variations in thickening rate. Furthermore, the prior art systems possess a disadvantage in that either the viscosity takes such a long time, e.g., 2 to 6 days, to rise that for a continuous process large inventories must be maintained, or the viscosity, once it begins to rise, continues rapidly through the moldable viscosity range and past it so that if the composition is not molded within a critical time period the composition becomes too stiff to be useful and must be scrapped.

It is an object of this invention to provide a process for thickening unsaturated polyester resin compositions rapidly to a controlled viscosity and maintaining the desired viscosity for an extended period of time.

It is a further object to provide unsaturated polyester resin compositions which can be controllably thickened to a desired viscosity upon the addition of an alkaline earth oxide thickening agent, and hold the desired viscosity over an extended period without becoming too viscous to mold properly or too low in viscosity so as to be tacky.

These objects and others as will become apparent from the disclosure are achieved by this invention which comprises a process for controlling the thickening of glass fiber filled unsaturated polyester resin compositions comprising thickening in the presence of an organic amide thickening controller. The invention also comprises polyester resin compositions having an organic amide thickening controller included therein, and low shrink systems wherein an organic amide thickening controller is either pre-incorporated in the unsaturated polyester resin component or in the component comprising a thermoplastic polymer dissolved in copolymerizable α,β-unsaturated monomer.

Figure 2:
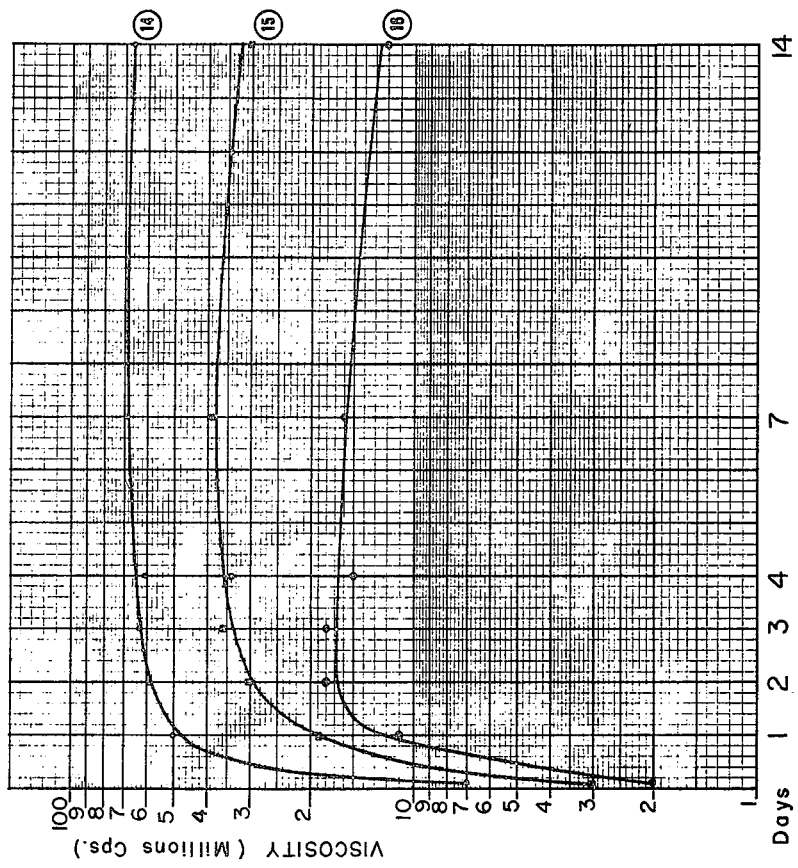
FIG. 2 is a graph of viscosity vs. time for several polyester resins compounded in accordance with certain embodiments of this invention illustrating how a particular viscosity can be rapidly achieved and maintained at a desired range determined by the particular amounts of organic amide and alkaline earth oxide or hydroxide.

Broadly this invention concerns the surprising discovery that organic amides used in combination with alkaline earth oxide or hydroxide thickening agents enhance the thickening effect of the thickening agent and control the rise in viscosity to a particular level at which the viscosity will remain for extended periods.

The polyester resins usable in this invention are unsaturated polyesters that are formed by the esterification of unsaturated polycarboxylic acids and polyhydric alcohols. Exemplary α,β-unsaturated polybasic acids and anhydrides include maleic anhydride, fumaric, chloromaleic, itaconic, and citraconic acids, and the like including mixtures thereof. Up to 75 mol percent of the unsaturated acid or anhydride can be replaced by saturated, i.e., non-α,β-ethylenically unsaturated dicarboxylic acids or anhydrides such as phthalic, tetrahydrophthalic or hexahydrophthalic acids or anhydrides, isophthalic, chlorendic, succinic, adipic, sebacic, and methyl succinic acids, and the like, and mixtures thereof. Polyhydric alcohols such as ethylene, propylene, butylene, diethylene, or triethylene glycols, glycerol, or mixtures of two or more polyols or alkylene oxides such as ethylene oxide can be used.

The unsaturated polyester is dissolved in at least one copolymerizable monomer containing a terminal

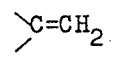

group which is preferably connected to an electronegative group such as the phenyl group as in styrene, hydrocarbon ring-substituted styrenes such as vinyl toluene, t-butyl styrene, and the like. Up to 50% of the copolymerizable ethylenically unsaturated monomer can be replaced with a lower alkyl ester of acrylic or methacrylic acid, α-methyl styrene, cyclic acrylates and methacrylates, benzyl methacrylates and acrylates, bicyclic acrylates and methacrylates, halogenated styrenes, alkylene glycol dimethacrylates, or diallyl phthalate and the like.

If a low shrink system is desired, from about 1 to about 25 weight percent of a thermoplastic polymer optionally containing up to about 5 weight percent acid groups, is incorporated with the previously described polyester and monomer. Thermoplastic polymers suitable as low shrink modifiers are those soluble or insoluble in the monomer component, for example soluble addition polymers such as poly (alkyl acrylates), poly (alkyl alkacrylates), polystyrene, and polyvinylacetate, and copolymers thereof. Other thermoplastic polymers suitable are polyethylene, cellulose acetate butyrate, poly (caprolactone), poly (vinyl chloride), and saturated polyesters.

The polyester resins most suitable have acid numbers up to about 50.

Colorants, pigments, release agents and polymerization initiators can be employed. Useful initiators include benzoyl peroxide, t-butyl peroctoate, di-t-butyl peroctoate, t-butyl perbenzoate, cyclohexane peroxide, di-t-butyl peroxide, and the like. The initiators are usually added to the resin system just before the processing steps. Useful concentrations of initiator are from 0.1 to 3% based on total resin.

SMCs and BMCs usually contain large amounts of filler, such as calcium carbonate. Ranges of 50 to 300 parts by weight of filler based on 100 parts of total resin are ordinary in the art.

The general procedure for SMCs is to sandwich about 5 to 50 parts by weight, preferably 20 to 30 parts by weight, glass fibers usually about an inch long and chopped from a continuous glass roving or contained in a chopped strand mat, between properly metered layers of the polyester formulation, and to cover the sandwich with polyethylene film while moving along a conveyor belt between steel rolls to saturate the glass fibers with the polyester formulation. The viscosity of the polyester should remain low at this stage of the procedure. The composite is then allowed to age while the viscosity rises to the point where the polyethylene film can be stripped and the surface of the composite is no longer tacky. The aging can take place at either room temperature or can be further accelerated by applying heat up to about 100°C. When the viscosity, which is continually rising in the prior art systems, reaches the "moldable viscosity range," the composite is cured in a mold using heat and pressure, into the desired shape. In accordance with this invention, the thickening is controlled so that the desired "molded viscosity range" is quickly reached and maintained in that range for an extended period.

For BMCs, the chopped glass is usually from about 5 to 30 percent by weight of the mix. The polyester is mixed with a filler and other ingredients in a mixer and the glass fibers added near the end of the mixing step.

Suitable alkaline earth oxide or hydroxide thickening agents include magnesium, calcium, beryllium, strontium, and barium oxides and hydroxides. Mixtures are also suitable. Preferred is magnesium oxide. Generally, the oxides are preferred over the hydroxides.

The thickening agent is generally added immediately before the processing steps so that the composition will remain fluid for the length of time required for processing.

Concentrations of alkaline earth oxide or hydroxide of from about 0.2 to about 10 percent by weight based on total resin are suitable, with concentrations of 0.4 to 3.0 preferred. We have found that to obtain the best advantage from this invention, the amount of thickening agent should be maintained to as close a tolerance as possible, since slight variances can greatly affect final viscosity.

Figure 1:
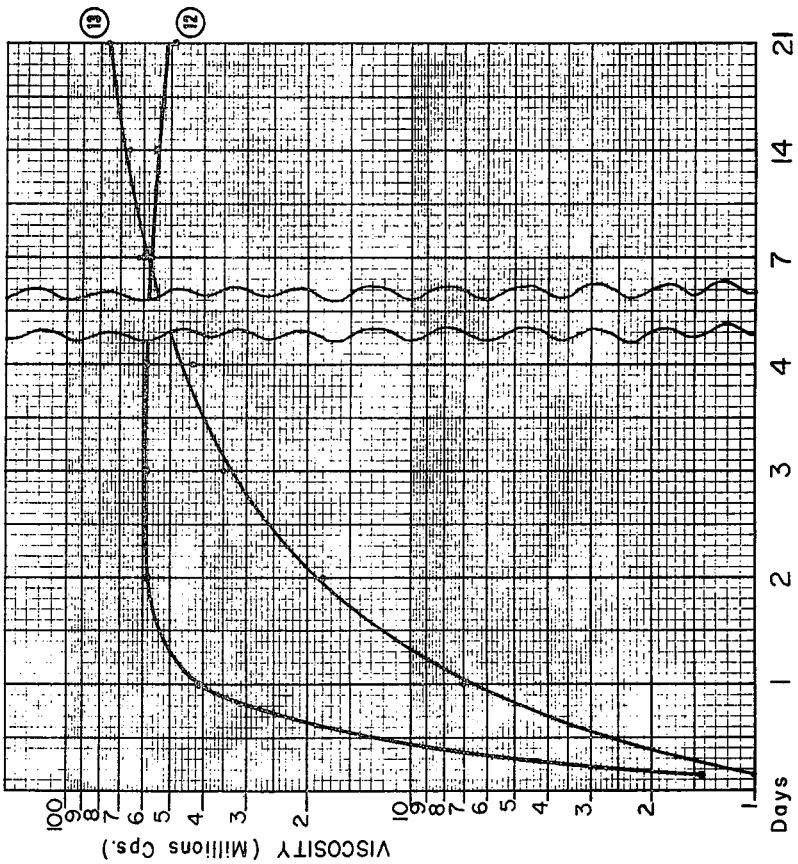
FIG. 1 is a comparative graph of viscosity vs. time for a polyester resin compounded according to prior art practices and a polyester resin incorporating an embodiment of this invention.

The alkaline earth oxide or hydroxide thickening agent, used alone, produces a continuous increase in viscosity of the polyester formulation with time, and at typical concentrations does not level off to a viscosity plateau. FIG. 1, curve 13 illustrates this phenomenon. The phenomenon is disadvantageous insofar as quality control is concerned since possible production delays or abnormally long storage times before the SMC and BMC is molded can result in difficulties in molding. In practice, large amounts of SMC or BMC are wasted because of excessive thickening. Even if the sheet is molded before the viscosity rises to the point where the formulation must be scrapped because it is too viscous, frequent changes in molding conditions such as mold pressure are required with variations in age of sheet.

It has been discovered that incorporation in the uncured polyester formulation of small amounts of an organic amide not only increase the rate of viscosity rise over that obtained with the alkaline earth oxide or hydroxide thickening agent used alone, but the organic amide also acts as a thickening controller in that it causes a plateau effect in that the resin can be made to rise to a desired viscosity and remain substantially constant at said viscosity. This has the great advantage to a manufacturer of SMC and BMC molded articles of allowing a larger range of time in which to mold the sheets since the viscosity will remain at optimum levels for extended periods.

A large variety of organic amides are suitable. Examples include fatty acid amides having from 1 to 20 carbon atoms such as formamide, acetamide, stearamide, etc.; N-alkyl amides such as N-methyl amides, e.g., N-methylformamide and N,N-dimethyl formamide; diamides such as malonamide; cyclic, heterocyclic and aromatic amides such as furamide, benzamide, etc.; and unsaturated amides such as methacrylamide, etc. Preferred organic amides are formamide, N-methyl formamide, and acetamide. Formamide is the most highly preferred amide.

Suitable amounts of organic amide thickening controller, based on total resin, are from about 0.05 to 7 percent by weight, preferably 0.25 to 3.0 percent by weight, with the exact amounts to be determined according to other conditions and the viscosity desired, as well as the speed of attainment of viscosity desired.

Suitable weight ratios of alkaline earth oxide or hydroxide to organic amide for best thickening rate and control are, we have found, about 4:1 to 1:4, and preferred weight ratios are about 2:1 to 1:2.

The organic amide thickening controller can be added to the uncured polyester compound at any stage of compounding. The thickening controller should be homogeneously blended throughout the polyester composition for maximum effectiveness. The thickening controller is preferably added prior to the introduction of the thickening agent, although, if desired, the thickening controller and thickening agent can be added simultaneously, for example by employing a premix of the two components. The thickening controller can be pre-incorporated in the unsaturated polyester in monomer component or in the optional low shrink thermoplastic polymer in monomer component.

The following examples are presented to illustrate several useful embodiments of the invention but are not intended to be limiting.

EXAMPLE 1

Polyester resin sheet molding compound (SMC) mixtures are made according to the formulations in Table 1 below.

The ingredients are blended in the order shown:

Table 1

| Ingredients | (Quantities in parts by weight) Formula A | Formula B |
|---|---|---|
| Polyester resin:[1] | | |
| Component I | 60.0 | 60.0 |
| Component II | 40.0 | 40.0 |
| Zinc stearate | 5.0 | 5.0 |
| t-butyl perbenzoate | 1.0 | 1.0 |
| Calcium carbonate filler[2] | 150.0 | 150.0 |
| Formamide | — | 0.6 |
| Magnesium oxide[3] | 0.6 | 0.6 |

[1]The polyester resin is a two component low-shrink molding resin having the following composition:
Component I - polyesterification product of 1.1 moles of propylene glycol with 1.0 mole of maleic anhydride (65 parts by weight); styrene monomer (35 parts by weight).

Component II - an acrylic terpolymer of methyl methacrylate, ethyl acrylate, and acrylic acid at 84.9/12.7/2.4 parts by weight (32 parts by weight); styrene monomer (68 parts by weight).

[2]Harry T. Campbell and Sons; Camel-White

[3]Merck Chemical Company; Maglite S

The mixtures are not impregnated into glass fibers but are placed in sealed containers and stored at 77°F. so that viscosity measurements vs. time can be made. At various times viscosities are measured at 77°F. with a Brookfield HBT Viscometer mounted on a heliopath stand and using a T-F spindle. Table 2 and corresponding FIG. 1 clearly show the advantage of an organic amide as a thickening controller used in combination with a magnesium oxide thickening agent.

Table 2

| Aging Time | Viscosity (million cps.) Formula A | Formula B |
|---|---|---|
| 4 hours | 1 | 4.3 |
| 1 day | 7 | 41 |
| 2 days | 18 | 58 |
| 3 days | 35 | 58 |
| 4 days | 43 | 58 |
| 7 days | 61 | 60 |
| 14 days | 66 | 55 |
| 21 days | 77 | 48 |

Curve 12 of FIG. 1 is a plot of viscosity rise over time for Formula B (containing thickening controller). Curve 13 of FIG. 1 is a plot of viscosity over time for the same composition without thickening controller.

Assuming that the desired moldable viscosity range (MVR) is 40 million to 60 million centipoises, it is seen that Formula A, which is representative of prior art, reaches the desired MVR after three to four days and exceeds the MVR after seven days. Formula B, which illustrates this invention, attains the MVR in one day and remains therein for the entire three weeks of the test. The MVR desired may vary depending on the conditions of use by the molder, however with this invention it is possible to alter the amount of organic amide and magnesium oxide to achieve and stay within any desired MVR as illustrated in Example 2.

EXAMPLE 2

Polyester SMC mixtures are made according to the formulae in Table 3 below. The ingredients are blended in the order shown:

Table 3

| Ingredients | Formula C | Formula D | Formula E |
|---|---|---|---|
| Polyester resin: | | | |
| Component I | 60 | 60 | 60 |
| Component II | 40 | 40 | 40 |
| Zinc stearate | 5 | 5 | 5 |
| t-butyl perbenzoate | 1 | 1 | 1 |
| Calcium carbonate | 150 | 150 | 150 |
| Formamide | 0.325 | 0.275 | 0.25 |
| Magnesium Oxide | 0.65 | 0.55 | 0.50 |

(See footnotes to Table 1 to identify ingredients.)

As in Example 1, the mixtures were not impregnated into glass fibers but are placed in sealed containers and stored at 77°F. At various times viscosities are measured. Table 4 and FIG. 2 illustrate the control of the viscosity range achieved through the use of this invention. Curves 14, 15 and 16 are plots of viscosity over time for Formulae C, D and E, respectively, to illustrate how any desired viscosity can be rapidly attained and retained by adjusting the amounts of thickening agent and thickening controller.

Table 4

| Aging Time | Viscosities (million cps.) Formula C | Formula D | Formula E |
|---|---|---|---|
| 4 hours | 7 | 3 | 2 |
| 1 day | 50 | 19 | 11 |
| 2 days | 59 | 30 | 18 |
| 3 days | 64 | 36 | 18 |
| 4 days | 61 | 34 | 15 |
| 7 days | 69 | 39 | 16 |
| 14 days | 66 | 30 | 12 |

Formula C achieves viscosities within a MVR of 50–70 million cps. With Formula D, a range of 20–40 million cps. is achieved and with Formula E, viscosity levels off in a range of 10–20 million cps. which may meet a particular end-user's requirements. All examples reached the desired MVR in one or, at most, two days and remained there for two weeks. Thus it may be seen that a molder may, by proper choice of amount and ratio of thickening agent and thickening controller, attain and hold a range of viscosities most useful in his particular operation.

EXAMPLE 3

Polyester SMC mixtures are prepared using a selected group of organic amides. The formulations are the same as given in Table 1 (Example 1) except for the type and amount of organic amide used. The latter information is given in Table 5 below:

Table 5

| Formula | Amide Used[1] | Parts by Weight of Amide |
|---|---|---|
| A | None (control) | — |
| B | Formamide | 0.6 |
| F | Formamide | 0.4 |
| G | N-methylformamide | 0.8 |
| H | Acetamide | 0.775 |
| I | Stearamide | 2.5 |
| J | N,N-dimethylformamide | 0.97 |
| K | Malonamide | 0.68 |
| L | Furamide | 1.47 |
| M | Benzamide | 1.6 |

[1]Amides (except stearamide, Formula I) were used in amounts which are equimolar with the formamide at 0.6 parts by weight, except stearamide which was used at the molar equivalent of formamide at 0.4 parts by weight.

These compositions are stored and viscosities determined as in Example 1. Table 6 below compares the effectiveness of the various amides in building viscosity of SMC mixes with time:

Table 6

| Aging Time | A | B | F | G | Viscosity (million cps.) H | I | J | K | L | M |
|---|---|---|---|---|---|---|---|---|---|---|
| 4 hours | 1 | 4.3 | 4.8 | 3.2 | 1.2 | 1.6 | 1.4 | 1.2 | 1.4 | 0.8 |
| 1 day | 7 | 41 | 42 | 23 | 16 | 14 | 11 | 10 | 10 | 6 |
| 2 days | 18 | 58 | 48 | 40 | 30 | 33 | 30 | 27 | 24 | 12 |
| 3 days | 35 | 58 | 58 | 48 | 39 | 44 | 38 | 40 | 38 | 21 |
| 4 days | 43 | 58 | 58 | — | 54 | 53 | — | — | — | 38 |
| 1 week | 61 | 60 | 64 | 46 | 52 | 71 | 49 | 60 | 53 | 43 |
| 2 weeks | 66 | 55 | 54 | 37 | 46 | 64 | 45 | 65 | 52 | 50 |
| 3 weeks | 77 | 48 | 42 | 33 | 29 | 61 | 40 | 64 | 47 | 38 |

As Table 6 shows, a variety of organic amides other than formamide are useful in this invention. Many organic amides do not give as quick an initial viscosity increase as formamide, but since they exert an effect on the leveling off of the viscosity over several weeks, they are of utility in the invention. One of the less preferred amides (benzamide, Formula M) produces slower initial viscosity increase than the control without amide (Formula A) but holds a fairly constant MVR after 4 days over the 3 week period.

EXAMPLE 4

A series of SMC mixtures are prepared using conventional polyester resins as shown in Table 7 below. The order of mixing is followed as in the table.

Table 7

| Ingredients | Formula N | (Quantities in Parts by Weight) Formula O | Formula P | Formula R |
|---|---|---|---|---|
| Resin X[1] | 100 | 100 | — | — |
| Resin Z[2] | — | — | 100 | 100 |
| Zinc stearate | 5 | 5 | 5 | 5 |
| t-butyl perbenzoate | 1 | 1 | — | — |
| Calcium carbonate filler | 150 | 150 | 150 | 150 |
| Formamide | — | 1 | — | 1 |
| Magnesium Oxide[3] | 1 | 1 | 1 | 1 |

[1]Stypol 2040; a commercial resilient isophthalic molding resin manufactured by Freeman Chemical.
[2]Poly(dipropylene glycol fumarate) at about 70% in styrene monomer.
[3]Same as in Table 1 (Example 1).

Table 8 below shows the viscosities of the compositions as a function of time.

Table 8

| Aging Time | Formula N | Viscosity (million cps.) Formula O | Formula P | Formula R |
|---|---|---|---|---|
| 4 hours | 1.2 | 6 | 2 | 25 |
| 1 day | 22 | 40 | 7 | 47 |
| 2 days | 39 | 50 | 10 | 52 |
| 3 days | 58 | 56 | 14 | 58 |
| 4 days | — | 60 | 30 | 58 |
| 1 week | 80 | 62 | 80 | 68 |
| 2 weeks | — | 63 | — | 62 |

Thus it is seen that the invention is not limited to low-shrink SMC formulations but can be used with conventional resins as well. The compositions based on magnesium oxide alone (N and P) show the characteristic gradual viscosity development with no leveling-off, while compositions O and R, which are illustrative of this invention, quickly increase in viscosity and remain within relatively constant viscosity ranges throughout the test period.

EXAMPLE 5

A series of SMC mixtures are prepared as in Table 1 of Example 1 except the amount of formamide is different and it is added to the low shrink modifier, a solution of acrylic polymer in styrene (Component II) several days before formula preparation. In Table 9 below the thickening results may be seen:

Table 9

| Aging Time | Viscosity (million cps.) Formula S | Formula T |
|---|---|---|
| 4 hours | 7 | 1.2 |
| 1 day | 41 | 9 |
| 2 days | 54 | 24 |
| 3 days | 52 | 37 |
| 4 days | 58 | 39 |
| 1 week | 55 | 59 |
| 2 weeks | 48 | 63 |
| Formamide (parts by weight) | 0.4 | none |
| Magnesium oxide (parts by weight) | 0.6 | 0.6 |

Thus, it is seen that the method of addition of the formamide may be altered without detracting from the rapid viscosity increase or the control of the viscosity, the principal advantage of this invention, as illustrated by comparing Formula S with Formula T.

EXAMPLE 6

A series of SMC mixtures are prepared as in Table 1 of Example 1 except the formamide is added to the polyester resin (Component I) a few days before preparation. Table 10 illustrates the effect on thickening using a formulation designed to achieve a low MVR (10–20 million cps.).

Table 10

| Aging Time | Viscosity (million cps.) | |
|---|---|---|
| | Formula U | Formula V |
| 4 hours | 4.8 | 0.9 |
| 1 day | 15 | 4 |
| 2 days | 16 | 7.6 |
| 3 days | 16 | 14 |
| 4 days | 16 | 16 |
| 1 week | 14 | 27 |
| 2 weeks | 10 | 29 |
| Formamide (parts by weight) | 0.4 | — |
| Magnesium oxide (parts by weight) | 0.5 | 0.5 |

Thus, addition of formamide to the polyester portion of the mixture again shows the flexibility possible with the use of the formamide in the invention (Formula U), as compared with Formula V.

EXAMPLE 7

About 70 parts by weight of the SMC compounds from Example 1 are impregnated through about 30 parts by weight of one inch lone chopped glass fibers sandwiched between polyethylene film, using a sheet molding compound machine as well known in the art. After one day the polyethylene film on the SMC sheet prepared using the Formula B (containing formamide as described in Example 1) can be easily peeled from the SMC.

Moldings with both ribs and bosses are molded in a matched-seal die mold mounted in a compression press at 300°F., 120 second cure time and 840 pounds per square inch. Flat moldings are also successfully prepared at 300°F., 120 seconds and 1225 pounds per square inch in a matched-metal die mold. Appearance of the moldings is very good. Molded parts of equally good quality are prepared at several intervals over a three-week period.

The SMC compound, made with Formula A (Example 1) prepared in the same manner, i.e. without formamide, remains sticky and soft after one day of aging and when an attempt to remove the polyethylene film is made, the SMC sticks to it so that it cannot be removed without portions of the mixture adhering to the polyethylene film. On the second day the polyethylene film can be removed. However, the SMC is still soft and tacky, making handling difficult and it requires 3 to 4 days aging before the desired MVR is attained and the SMC can be molded. After 7 days from the time of preparation, the (Formula A) SMC has increased in viscosity to above the desired MVR (Table 2 - Formula A). When this happens, the SMC may still be molded but adjustments such as high mold pressures are necessary so the SMC compound and the glass will flow uniformly to fill the mold completely.

What is claimed is:

1. An unsaturated polyester resin composition which rapidly achieves a desired viscosity upon addition of catalyst and an alkaline earth oxide or hydroxide thickening agent and maintains said desired viscosity over extended periods of time comprising:
   A. an unsaturated polyester which is a condensate of at least one $\alpha,\beta$-ethylenically unsaturated dicarboxylic acid and at least one dihydric alcohol with the proviso that up to 75 mol percent of said unsaturated dicarboxylic acid can be replaced by saturated dicarboxylic acid;
   B. an $\alpha,\beta$-ethylenically unsaturated monomer; and
   C. a thickening controller selected from the group consisting of fatty acid amides having from 1 to 20 carbon atoms.

2. The composition of claim 1 wherein the organic amide is selected from the group consisting of formamide, acetamide, and N-methyl formamide.

3. The composition of claim 1 wherein the thickening controller is present in an amount of about 0.05 to 7 weight parts by weight based on 100 weight parts of A and B.

4. An unsaturated polyester resin composition for producing glass fiber reinforced molded articles with reduced shrinkage which, upon addition of a catalyst and alkaline earth oxide or hydroxide thickening agent, rapidly achieves and maintains for extended periods a desired viscosity comprising:
   A. from about 20 to about 80 weight parts of an $\alpha,\beta$-ethylenically unsaturated polyester which is a condensation product of at least one $\alpha,\beta$-ethylenically unsaturated dicarboxylic acid or anhydride and at least one dihydric alcohol or alkylene oxide with the proviso that up to 25 mol percent of said ethylenically unsaturated dicarboxylic acid can be replaced by saturated dicarboxylic acid,
   B. from about 20 to about 80 weight parts of an ethylenically unsaturated monomer system comprising at least one member selected from the group consisting of styrene and hydrocarbon ring-substituted styrenes, and from 0 to about 50 weight percent of a monomer selected from the group consisting of alkyl esters of acrylic and methacrylic acid, $\alpha$-methyl styrene, cyclic acrylates and methacrylates, benzyl methacrylates and acrylates, bicyclic acrylates and methacrylates, halogenated styrenes, alkylene glycol dimethacrylates, and diallyl phthalate;
   C. from about 1 to about 25 weight parts of low shrink modifier selected from the group consisting of thermoplastic polymers; provided, the total of A, B and C is 100 weight parts, and
   D. from about 0.05 to about 7 weight parts of a thickening controller based on 100 parts A, B and C, said thickening controller being selected from the group consisting of fatty acid amides having from 1 to 20 carbon atoms and mixtures thereof.

5. The composition of claim 4 wherein said thickening controller is formamide.

6. The composition of claim 5 wherein said formamide is present in an amount of about 0.25 to 3.0 weight parts.

7. The composition of claim 4 wherein the thermoplastic polymer is selected from the group consisting of cellulose acetate butyrate, saturated polyesters, polymers of alkyl acrylates, alkyl alkacrylates, styrene, vinyl acetate, ethylene, caprolactone, vinyl chloride and copolymers thereof.

8. A modifier for glass reinforced unsaturated polyester resins comprising an ethylenically unsaturated monomer selected from the group consisting of styrene and hydrocarbon ring-substituted styrenes, having dissolved therein a thermoplastic polymer capable of imparting reduced shrinkage qualities of articles molded from said unsaturated polyester resins, and a fatty acid amide having from 1 to 20 carbon atoms thickening controller.

9. The modifier of claim 8 comprising a solution of an acid functional thermoplastic addition polymer and formamide in styrene.

10. A composition for controlled thickening of glass fiber-filled polyester resin compositions comprising a combination of a thickening agent selected from the group consisting of alkaline earth oxides, alkaline earth hydroxides, and mixtures thereof, and a fatty acid amide having from 1 to 20 carbon atoms thickening controller.

11. The composition of claim 10 wherein the ratio of thickening agent to thickening controller is from about 4:1 to about 1:4.

12. The composition of claim 10 wherein the thickening agent is magnesium oxide and the thickening controller is formamide, and the ratio of magnesium oxide to formamide is from about 2:1 to about 1:2.

13. A process for controlling the thickening of glass fiber-filled unsaturated polyester resin $\alpha,\beta$-ethylenically unsaturated monomer, compositions comprising admixing from about 0.05 to about 7 parts of a thickening controller selected from the group consisting of fatty acid amides having from 1 to 20 carbon atoms and mixtures thereof and from about 0.2 to about 10 parts of thickening agent selected from the group consisting of alkaline earth oxides, alkaline earth hydroxides, and mixtures thereof per 100 parts resin.

14. Sheet molding compound of moldable viscosity comprising an unsaturated polyester resin $\alpha\beta$-ethylenically unsaturated monomer glass reinforcing fibers, particulate filler and catalyst, which has been thickened with a thickening agent selected from the group consisting of alkaline earth oxides, alkaline earth hydroxides, and mixtures thereof, and a thickening controller selected from the group consisting of fatty acid amides having from 1 to 20 carbon atoms.

15. The process of claim 13 wherein the organic amide is formamide.

16. The sheet molding compound of claim 14 wherein the organic amide is formamide.

* * * * *